(12) United States Patent
Fesperman

(10) Patent No.: US 9,723,827 B2
(45) Date of Patent: Aug. 8, 2017

(54) FARRIER HOOF CRADLE AND TOOL CADDY KIT

(71) Applicant: Cliffie Fesperman, Albemarie, NC (US)

(72) Inventor: Cliffie Fesperman, Albemarie, NC (US)

( * ) Notice: Subject to any disclaimer, the term of this patent is extended or adjusted under 35 U.S.C. 154(b) by 162 days.

(21) Appl. No.: 14/831,056

(22) Filed: Aug. 20, 2015

(65) Prior Publication Data
US 2017/0049091 A1    Feb. 23, 2017

(51) Int. Cl.
*A01L 11/00*        (2006.01)

(52) U.S. Cl.
CPC .................................... *A01L 11/00* (2013.01)

(58) Field of Classification Search
CPC ....... A01L 11/00; A01L 15/00; A01K 1/0613; F16M 13/04; F16M 2200/00; F16M 11/28; F16M 11/18; F16M 11/22; B66F 3/25
See application file for complete search history.

(56) References Cited

U.S. PATENT DOCUMENTS

| 124,452 | A | * | 3/1872 | Shimer | A01L 11/00 168/44 |
|---|---|---|---|---|---|
| 743,807 | A | * | 11/1903 | Begg | A01L 11/00 168/44 |
| 1,278,628 | A | * | 9/1918 | France et al. | A01L 11/00 168/44 |
| 2,289,212 | A | * | 7/1942 | Rinnela | A43D 117/00 211/131.1 |
| 4,167,216 | A | * | 9/1979 | Beaston | A01L 11/00 168/44 |
| 5,337,892 | A | * | 8/1994 | Zaffina | B25H 3/025 206/315.11 |
| 5,458,243 | A | * | 10/1995 | McBride | A47B 57/30 206/503 |

(Continued)

FOREIGN PATENT DOCUMENTS

GB    2502886    * 12/2013    ............. A01L 11/00

OTHER PUBLICATIONS

Pieh Tool Company, Hoofjack, http://www.piehtoolco.com/contents/en-us/p9590.html, published Feb. 15, 2011, accessed Mar. 27, 2017.*

(Continued)

*Primary Examiner* — Kathleen Alker
(74) *Attorney, Agent, or Firm* — Stevenson IP, LLC

(57) ABSTRACT

A farrier hoof cradle and tool caddy kit providing one structure to support a horse's hoof during repair, shoeing, and finishing and a wheeled pedestal with storage trays to store farrier-associated tools and accessories. A first base has a vertical first support member centrally disposed on a top side thereof and a hollow vertical first rod centrally disposed atop the vertical first support member. Height-adjustable first and second poles alternately engage with the first rod. A U-shaped hoof cradle is disposed atop the first pole. A disc-shaped finishing stand is disposed atop the second pole. The wheeled pedestal has a tapered second rod vertically disposed thereon with a grooved handgrip proximal an upper end thereof. Each tray has a central orifice that slidingly engages the second rod to a point in which the second rod has a diameter larger than the central orifice.

11 Claims, 5 Drawing Sheets

(56) References Cited

U.S. PATENT DOCUMENTS

| | | | | |
|---|---|---|---|---|
| 5,715,954 A * | 2/1998 | Zaremba | ............... | A47F 5/04 |
| | | | | 211/107 |
| 5,873,312 A * | 2/1999 | Mauro-Vetter | ......... | B25H 3/06 |
| | | | | 108/147.21 |
| 6,123,206 A * | 9/2000 | Zaremba | ............ | A47B 57/26 |
| | | | | 108/147.13 |
| 6,766,912 B1 * | 7/2004 | Gibbs | ............ | A47G 23/0225 |
| | | | | 211/74 |
| 6,863,253 B2 * | 3/2005 | Valentz | ............ | E04D 13/12 |
| | | | | 248/125.8 |
| D509,327 S * | 9/2005 | Keeler | ............ | 168/44 |
| 7,270,192 B2 | 9/2007 | Leonard | | |
| 7,387,171 B2 | 6/2008 | Keeler | | |
| 7,510,021 B2 | 3/2009 | Tyree | | |
| 7,641,156 B2 * | 1/2010 | Medders | ............ | A47B 81/04 |
| | | | | 211/203 |
| 8,915,306 B2 * | 12/2014 | Adams | ............ | A01L 13/00 |
| | | | | 168/44 |
| 9,400,080 B2 * | 7/2016 | Chen | ............ | F16M 11/28 |
| 2006/0113090 A1 * | 6/2006 | DeCola | ............ | A01L 11/00 |
| | | | | 168/44 |
| 2008/0203265 A1 * | 8/2008 | Zhang | ............ | B25H 1/0007 |
| | | | | 248/352 |
| 2012/0132152 A1 * | 5/2012 | Thacker | ............ | A01K 1/0613 |
| | | | | 119/749 |

OTHER PUBLICATIONS

High Country Plastics, Maintenance/Farrier Stand, http://www.highcountryplastics.com/products/maintenance-farrier-tools/maintenance-farrier-stand.html, accessed Mar. 27, 2017.*

* cited by examiner

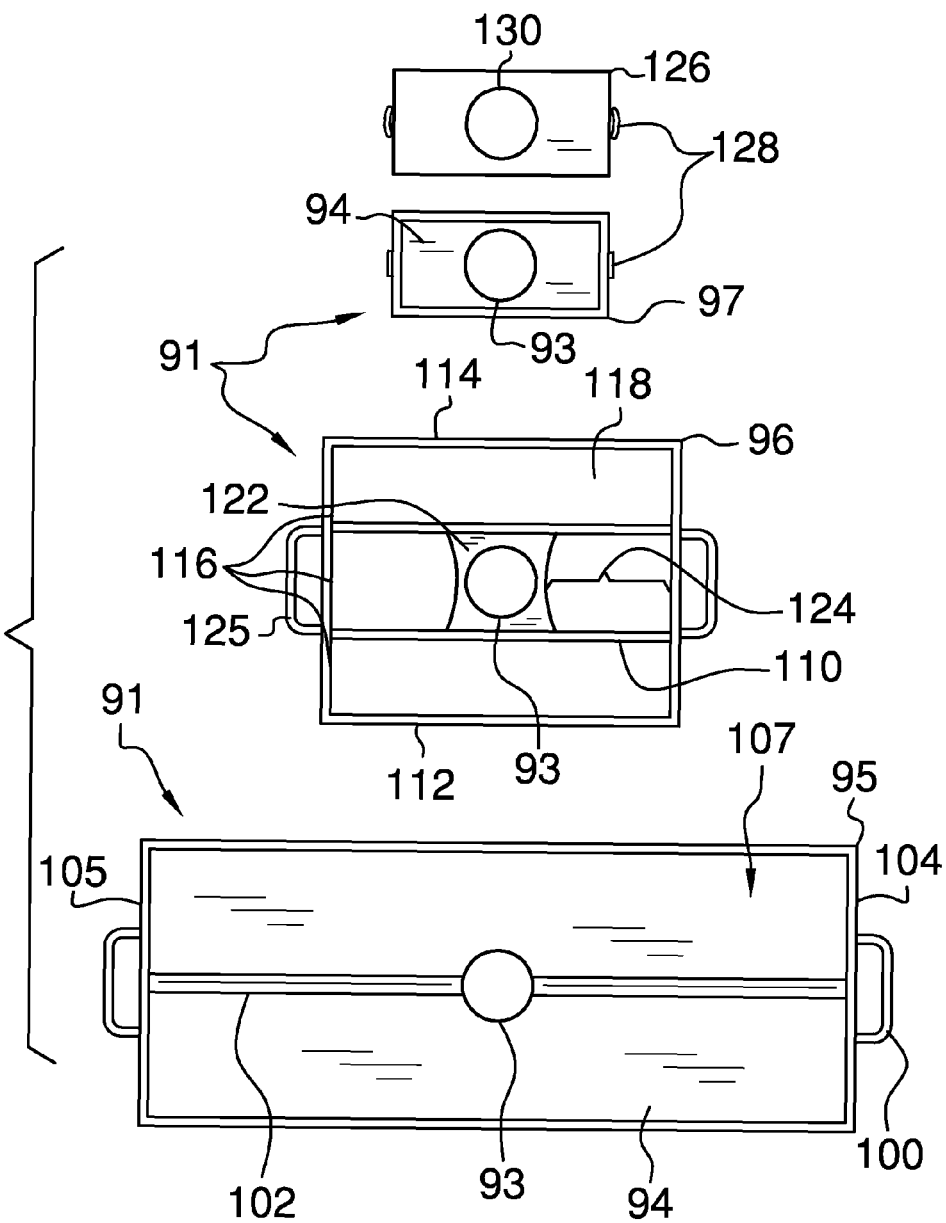

FARRIER HOOF CRADLE AND TOOL CADDY KIT

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of hoof care stands are known in the prior art. However, the present kit provides both a farrier hoof cradle and a tool caddy which offers safety to both the farrier and the horse.

FIELD OF THE INVENTION

The present invention relates to hoof care stands, and more particularly, to a farrier hoof cradle and tool caddy kit.

SUMMARY OF THE INVENTION

The general purpose of the present farrier hoof cradle and tool caddy kit, described subsequently in greater detail, is to provide a farrier hoof cradle and tool caddy kit which has many novel features that result in a farrier hoof cradle and tool caddy kit which is not anticipated, rendered obvious, suggested, or even implied by prior art, either alone or in combination thereof.

To accomplish this, the present farrier hoof cradle and tool caddy kit provides one structure to support a horse's hoof during repair, shoeing, and finishing and another structure to store tools and accessories needed by a farrier. The present kit includes a first base with a vertical first support member centrally disposed on a top side thereof and a hollow vertical first rod centrally disposed atop the vertical first support member. Height-adjustable first and second poles alternately engage with the first rod. A U-shaped hoof cradle, centrally disposed atop the first pole, has a central portion with a width and a length and a pair of sidewalls with a height configured to receive and stabilize an equine's hoof within the hoof cradle. A rubberized sleeve removably engages the hoof cradle. A finishing stand includes a disc disposed atop the second pole sized to support the equine's hoof atop thereon and is configured to support the equine's hoof for finishing.

The present kit also includes a wheeled pedestal having a tapered vertical second rod centrally disposed thereon. A grooved handgrip is disposed proximal an upper end of the second rod. A pair of spaced-apart wheels is disposed on the pedestal on a same side of the pedestal. A plurality of trays removably engages the second rod in a stacked configuration Because the second rod is tapered, each of the trays engages the second rod to a point immediately below the handgrip in which the second rod has a diameter larger than a respective central orifice of each tray.

Thus has been broadly outlined the more important features of the present farrier hoof cradle and tool caddy kit so that the detailed description thereof that follows may be better understood and in order that the present contribution to the art may be better appreciated.

BRIEF DESCRIPTION OF THE DRAWINGS FIGURES

FIG. 5 is a top plan view of the tool caddy components.

DETAILED DESCRIPTION OF THE DRAWINGS

Figure 1:
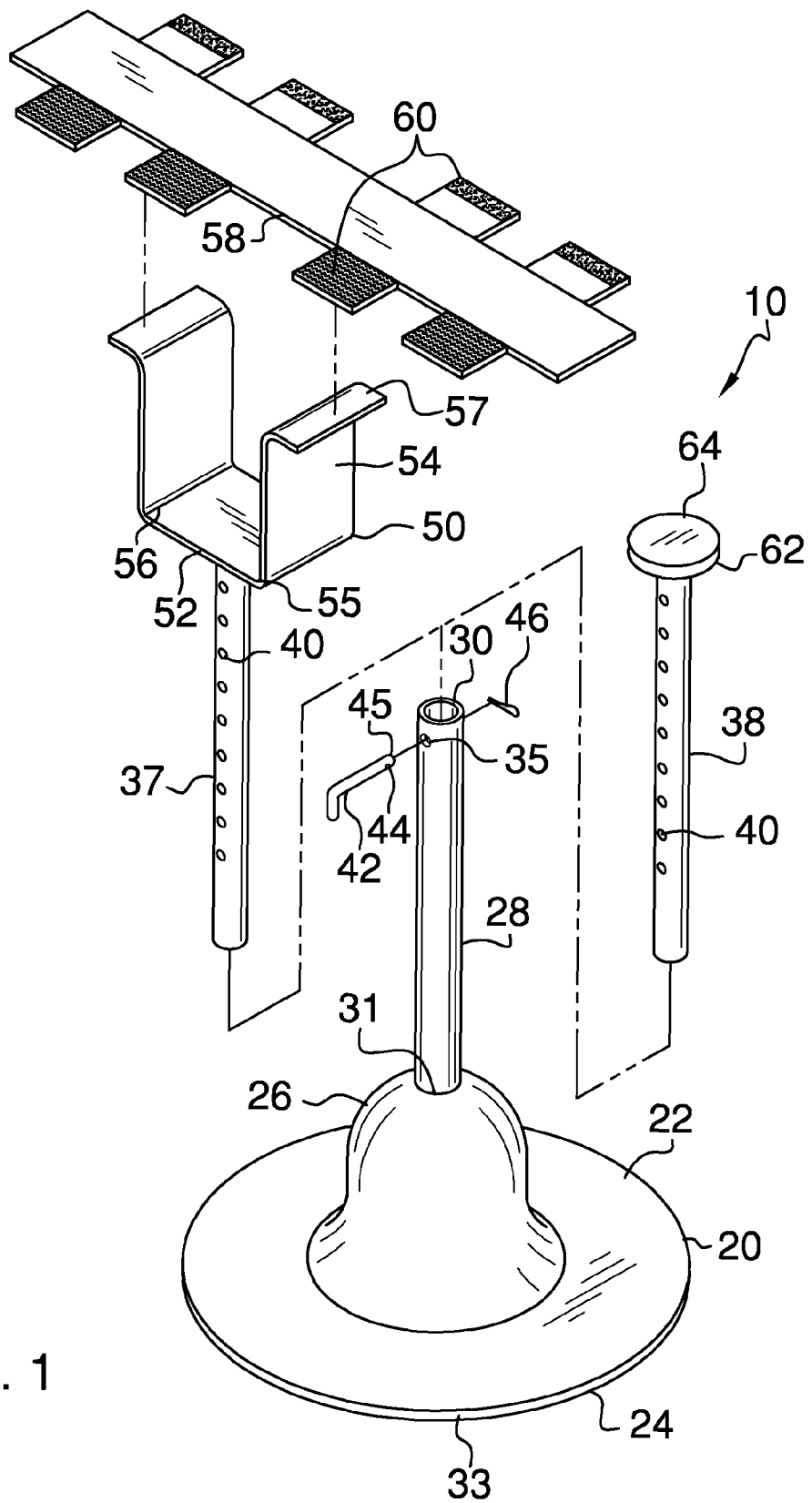
FIG. 1 is an exploded front isometric view of an interchangeable hoof cradle and a finishing stand.
Figure 2:
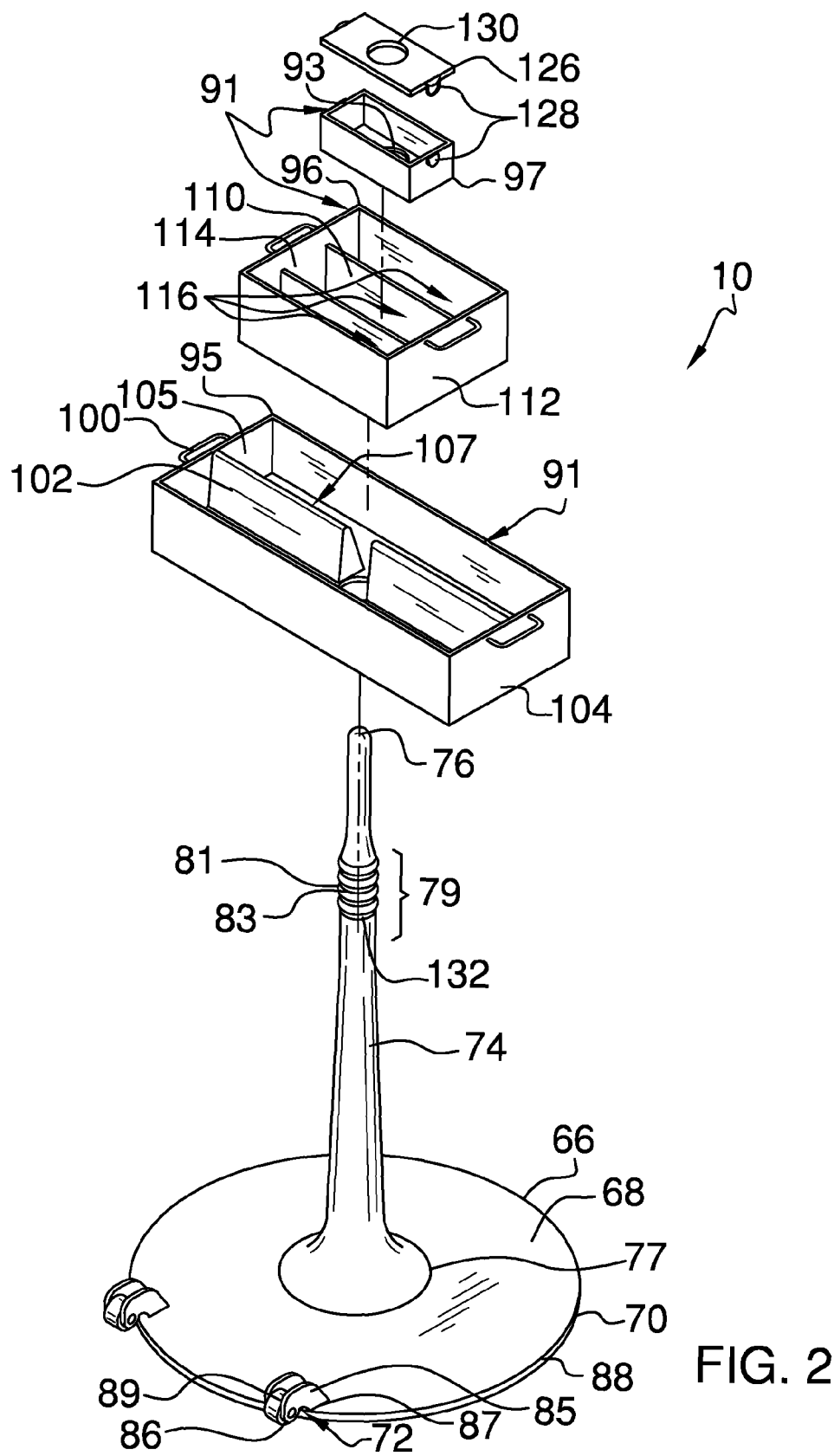
FIG. 2 is an exploded front isometric view of a tool caddy.
Figure 3:
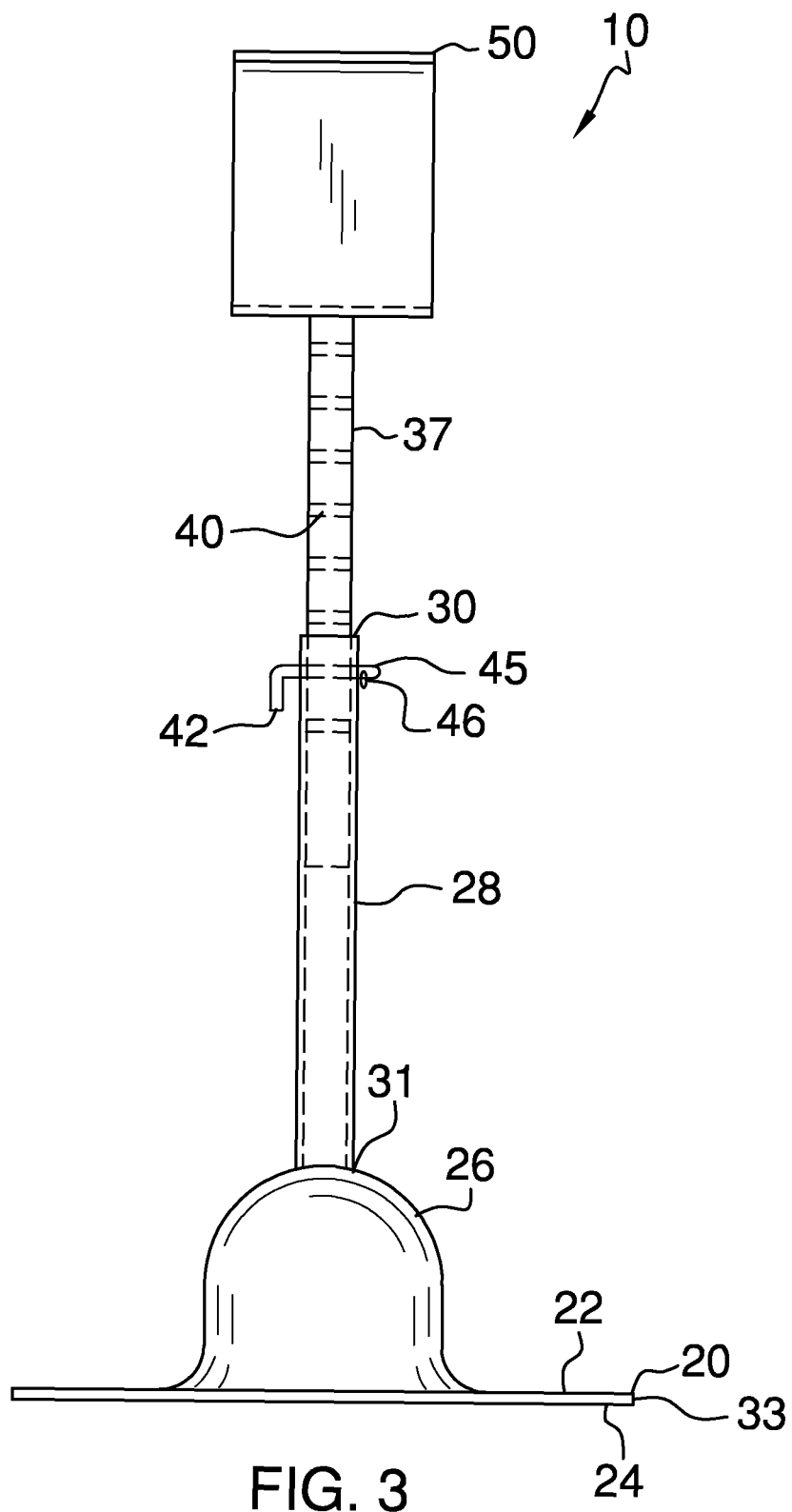
FIG. 3 is a side elevation view with the hoof cradle attached to a telescopic support rod.

With reference now to the drawings, and in particular FIGS. 1 through 5 thereof, an example of the instant farrier hoof cradle and tool caddy kit employing the principles and concepts of the present farrier hoof cradle and tool caddy kit and generally designated by the reference number 10 will be described. Referring to FIGS. 1 through 5, the present farrier hoof cradle and tool caddy kit 10 is illustrated. The farrier hoof cradle and tool caddy kit 10 includes a first base 20 having a top side 22 and a bottom side 24. An inverted bell-shaped vertical first support member 26 is centrally disposed on the first base 20 top side 22. A hollow vertical first rod 28 has an open top end 30 and a bottom end 31, which is centrally disposed on the vertical first support member 26. The first base 20 has a width to permit a farrier to step onto the top side 22 between the bottom end 31 and an outer perimeter 33 of the first base 20 during use to assist in stabilizing the first base 20. An aperture 35 is disposed through the first rod 28 proximal the top end 30.

A height-adjustable first pole 37 and a height-adjustable second pole 38 are provided and are alternately slidingly engageable with the first rod 28. Each of the first pole 37 and the second pole 38 has a plurality of openings 40 vertically aligned therethrough. An L-shaped adjustment pin 42 is engageable through the aperture 35 and one of the openings 40 when one of the first pole 37 and the second pole 38 engages the first rod 28. The adjustment pin 42 has a hole 44 therethrough proximal an insertion end 45 thereof and a fastener 46, such as a cotter pin, is engagable with the hole 44 to fix one of the first and second poles 37, 38 into a desired height.

A hoof cradle 50 is centrally disposed atop the first pole 37. The hoof cradle 50 includes a central portion 52 perpendicular to the first pole 37 and a sidewall 54 vertically disposed on each of a right side 55 and a left side 56 of the central portion 52 in a position perpendicular to the central portion 52. Each sidewall 54 has an outwardly bent top edge 57 in a position substantially parallel to the central portion 52. The central portion 52 has a width and a length and each sidewall 54 has a height configured to receive and stabilize an equine's hoof within the hoof cradle 50. A rubberized sleeve 58 is provided to removably engage the hoof cradle 50. The rubberized sleeve 58, attachable with hook and loop fasteners 60, is provided for a comfortable support of a horse's hoof and for stability during use. The hoof cradle 50 is provided in a range of dimensions to accommodate a range of horse hoof sizes.

A finishing stand 62 is disposed atop the second pole. The finishing stand 62 includes a disc 64 disposed atop the second pole 38. The disc 64 is sized to support the equine's hoof atop thereon and is configured to support the equine's hoof for finishing. Each of the first and second poles 37, 38 has a maximum extension length of 12 inches to accommodate varied horse leg lengths for proper positioning during the finishing process.

Figure 4:
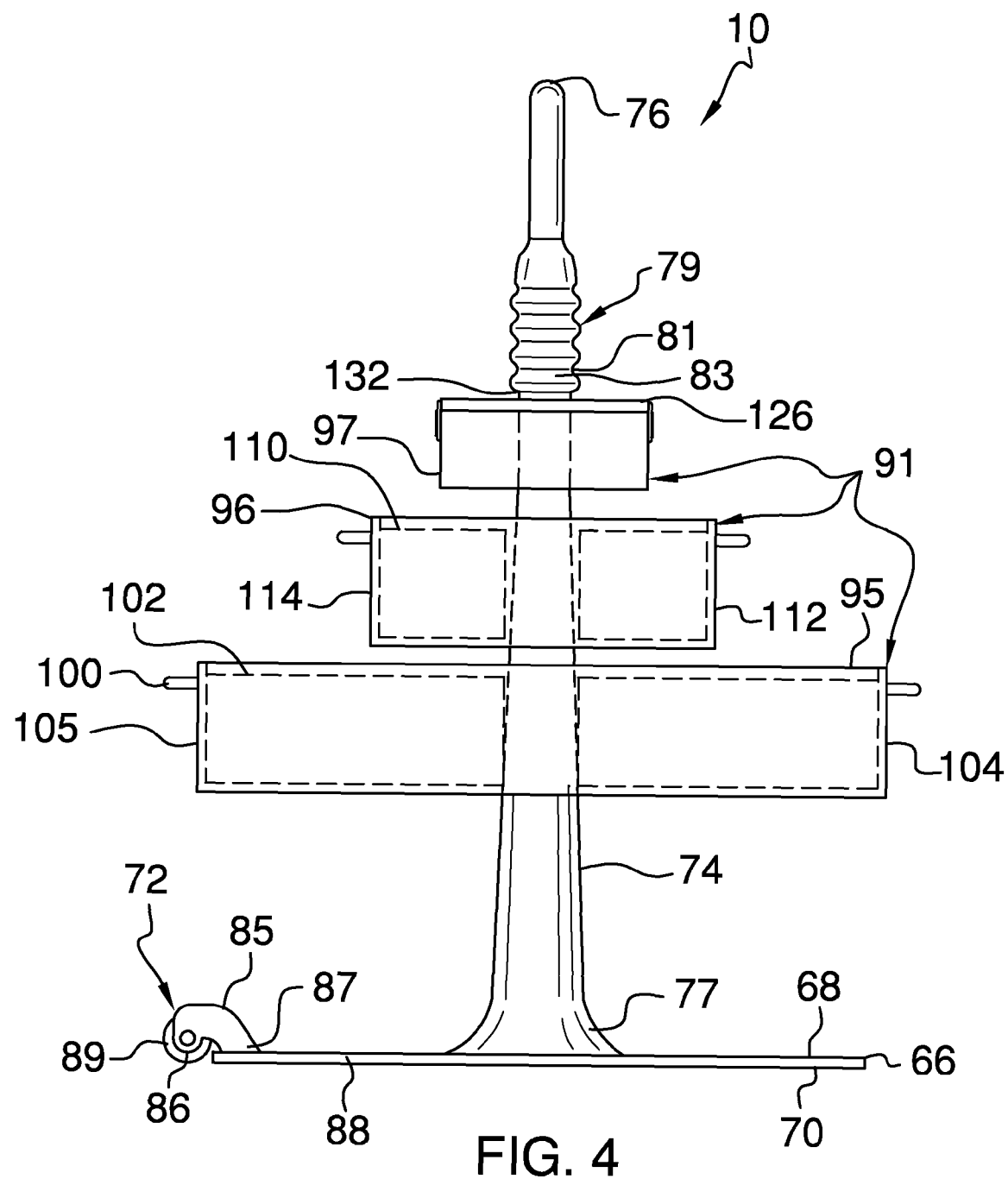
FIG. 4 is a side elevation view of the tool caddy in an assembled condition.

The present kit 10 also includes a pedestal 66, which has an upper side 68 and a lower side 70. The pedestal 66 can include at least one pair of wheel assemblies 72 to provide all-terrain transport of the pedestal 66 or can be provided without wheels for stationary positioning. The wheel assemblies 72 can be disposed on a same side of the pedestal 66 as shown in FIG. 4. A tapered vertical second rod 74 is centrally disposed on the pedestal 66 upper side 68 and has an upper end 76 and a lower end 77. The lower end 77 has a width wider than a width of the upper end 76. The upper end 76 includes a grooved handgrip 79 comprising a plurality of continuous horizontal grooves 81 circumferentially disposed on the second rod 74 proximal the upper end 76. A protrusion 83, which is preferably a popoid, is disposed between each of the grooves 81. The handgrip 79 assists the farrier in controlling the pedestal 66 during use and during transport.

The at least one pair of the spaced-apart wheel assemblies 72 is disposed on the pedestal 66 on a same side of the pedestal 66. Each of the wheel assemblies 72 includes a pair of inverted U-shaped arms 85 parallel to each other. Each arm 85 has a proximal end 87 disposed on the upper side 68 of the pedestal 66 and a distal end 86 extending beyond and disposed proximal an external perimeter 88 of the pedestal 66 and a wheel 89 pivotably disposed between the distal ends 86 of the arms 85 thus allowing the farrier to tilt the pedestal 66 for transport.

A plurality of trays 91 is removably disposed on the second rod 74. Each tray 91 has a central orifice 93. The second rod 74 engages the central orifice 93 of each tray 91 in a mounted condition. The plurality of trays 91 includes a first tray 95, a second tray 96, and a third tray 97. Because the second rod 74 is tapered, each of the trays 91 engages the second rod 74 to a point immediately below the handgrip 79 in which the second rod 74 has a diameter larger than the respective central orifice 93.

The first tray 95 has a pair of handles 100 and a pair of longitudinally aligned dividers 102 centrally disposed in the first tray 95. The dividers 102 are disposed on opposite sides of the central orifice 93 from a right side 104 to a left side 105 of the first tray 95. Each divider 102 forms a pair of compartments 107. The first tray 95 is configured to store files, pick, ointments, and other farrier accessories in a horizontal position therein.

The second tray 96 has a pair of spaced apart internal walls 110 continuously disposed in a parallel position to each other across the second tray 96 from a right end 112 to a left end 114 thereof. The internal walls 110 define a triad of tray sections 116. Each of the tray sections 116 has an open bottom side 118. A middle section 120 of the tray sections 116 includes a brace 122 surrounding the center orifice 93. Thus, the brace 122 divides the bottom side 118 into half portions 124. The open bottom side 118 allows the hanging of nippers, sprays, and rags, as well as other farrier items designed to be hanged, from the internal walls 110. The second tray 96 also has a pair of handles 125 thereon.

The third tray 97, which is the uppermost tray of the trays when engaging the second rod 74, has a lid 126 and a fastening 128 configured to secure the lid 126 to the third tray 97. The lid 126 has a center opening 130 disposed therein. The fastening 128 is a pair of clasps or other closure member devised for heavy-duty fastening because the third tray 97 is configured to contain horse shoe nails therein. The first tray 95 has a length and a width greater than a length and width of the second tray 96. The second tray 96 has a length and width greater than a length and width of the third tray 97. The central orifice 93 is disposed in a closed bottom wall 94 of each of the first and third trays 95,97.

The first tray 95 is configured to slidingly engage the second rod 74 in vertical position lower thereon than a vertical position of the second tray 96 when the second rod 74 is in an upright position. The third tray 97 is configured to slidingly engage the second rod 74 in a vertical position above a vertical position of the second tray 96 and proximal a lowermost groove 132 of the grooves 81 when the second rod 74 is in an upright position. In the mounted condition, each tray 91 is removably disposed on the second rod 74 in a position parallel to the pedestal 66 and the trays 91 are in a stacked configuration with the third tray 97 of the trays proximal the lowermost groove 132.

The materials used to form the present device 10 are commensurate with the functionality of the present device. By way of example only, the first base 20, the first support rod, the pedestal, vertical second support member, and the second rod can be formed of cast iron, machined iron, or steel, to provide durability and strength sufficient to permit the device to be used for horse hoof care.

What is claimed is:

1. A farrier hoof cradle and tool caddy kit comprising:
   a first base having a top side and a bottom side;
   a vertical first support member centrally disposed on the first base top side;
   a hollow vertical first rod having an open top end and a bottom end, the bottom end being centrally disposed on the vertical first support member;
   wherein the first base has a width to permit a farrier to step onto the top side between the bottom end and an outer perimeter of the first base during use to assist in stabilizing the first base;
   an aperture disposed through the first rod proximal the top end;
   a height-adjustable first pole and a height-adjustable second pole alternately engageable with the first rod, each of the first pole and the second pole having a plurality of openings vertically aligned therethrough;
   an L-shaped adjustment pin engageable through the aperture and one of the openings when one of the first pole and the second pole engages the first rod, the adjustment pin having a hole therethrough proximal an insertion end thereof;
   a fastener engagable with the hole;
   a hoof cradle centrally disposed atop the first pole, the hoof cradle comprising:
     a central portion perpendicular to the first pole;
     a sidewall vertically disposed on each of a right side and a left side of the central portion in a position perpendicular to the central portion, each sidewall having an outwardly bent top edge in a position substantially parallel to the central portion;
     wherein the central portion has a width and a length and each of the sidewalls has a height configured to receive and stabilize an equine's hoof within the hoof cradle;
   a finishing stand disposed atop the second pole, the finishing stand comprising:
     a disc disposed atop the second pole;

wherein the disc is sized to support the equine's hoof atop thereon;
wherein the disc is configured to support the equine's hoof for finishing;
a pedestal having an upper side and a lower side;
a vertical second rod centrally disposed on the pedestal upper side, the second rod having an upper end and a lower end, the upper end having a grooved handgrip comprising a plurality of continuous horizontal grooves circumferentially disposed on the second rod proximal the upper end and a protrusion, disposed between each of the grooves; and
a plurality of trays securable on the second rod in a stacked configuration parallel to the pedestal, wherein an uppermost tray of the trays is disposed proximal a lowermost groove of the grooves.

2. The farrier hoof cradle and tool caddy kit of claim 1 wherein the plurality of trays comprises:
a first tray having a pair of handles and a pair of longitudinally aligned dividers centrally disposed in the first tray, wherein the dividers are disposed on opposite sides of a first tray center from a right side to a left side of the first tray, wherein each divider forms a pair of compartments;
a second tray having a pair of handles and a pair of spaced apart internal walls continuously disposed in a parallel position to each other across the second tray from a right end to a left end thereof, wherein the internal walls define a triad of tray sections, each of the tray sections having an open bottom side;
a middle section of the tray sections comprising a brace surrounding the center orifice of the second tray, the brace dividing the bottom side of the middle section into half portions; and
a third tray being the uppermost tray of the trays, the third tray having a lid and at least one fastening configured to secure the lid to the third tray, wherein the lid has a center opening disposed therein;
wherein the first tray has a length and a width greater than a length and width of the second tray;
wherein the second tray has a length and width greater than a length and width of the third tray;
wherein the first tray is configured to slidingly engage the second rod in vertical position lower thereon than a vertical position of the second tray when the second rod is in an upright position; and
wherein the third tray is configured to slidingly engage the second rod in a vertical position above a vertical position of the second tray and proximal the lowermost groove when the second rod is in an upright position.

3. The farrier hoof cradle and tool caddy kit of claim 2 further comprising a pair of spaced-apart wheel assemblies disposed on the pedestal on a same side of the pedestal.

4. The farrier hoof cradle and tool caddy kit of claim 3 wherein each of the wheel assemblies comprises:
a pair of inverted U-shaped arms parallel to each other, each arm having a proximal end disposed on the upper side of the pedestal and a distal end extending beyond and disposed proximal an external perimeter of the pedestal; and
a wheel pivotably disposed between the distal ends of the arms.

5. The farrier hoof cradle and tool caddy kit of claim 1 further comprising at least a pair of spaced-apart wheel assemblies disposed on the pedestal.

6. A farrier hoof cradle and tool caddy kit comprising:
a first base having a top side and a bottom side;
an inverted bell-shaped vertical first support member centrally disposed on the first base top side;
a hollow vertical first rod having an open top end and a bottom end, the bottom end being centrally disposed on the vertical first support member;
wherein the first base has a width to permit a farrier to step onto the top side between the bottom end and an outer perimeter of the first base during use to assist in stabilizing the first base;
an aperture disposed through the first rod proximal the top end;
a height-adjustable first pole and a height-adjustable second pole alternately engageable with the first rod, each of the first pole and the second pole having a plurality of openings vertically aligned therethrough;
an L-shaped adjustment pin engageable through the aperture and one of the openings when one of the first pole and the second pole engages the first rod, the adjustment pin having a hole therethrough proximal an insertion end thereof;
a fastener engagable with the hole;
a hoof cradle centrally disposed atop the first pole, the hoof cradle comprising:
a central portion perpendicular to the first pole;
a sidewall vertically disposed on each of a right side and a left side of the central portion in a position perpendicular to the central portion, each of the sidewalls having an outwardly bent top edge in a position substantially parallel to the central portion;
wherein the central portion has a width and a length and the sidewalls have a height configured to receive and stabilize an equine's hoof within the hoof cradle;
a finishing stand disposed atop the second pole, the finishing stand comprising:
a disc disposed atop the second pole;
wherein the disc is sized to support the equine's hoof atop thereon;
wherein the disc is configured to support the equine's hoof for finishing;
a pedestal having an upper side and a lower side, the pedestal having at least a pair of wheel assemblies disposed on a same side of the pedestal;
a tapered vertical second rod centrally disposed on the pedestal upper side, the second rod having an upper end and a lower end, wherein the lower end has a width wider than a width of the upper end, the upper end comprising:
a grooved handgrip comprising a plurality of continuous horizontal grooves circumferentially disposed on the second rod proximal the upper end and a protrusion disposed between each of the grooves; and
a plurality of trays comprising:
a first tray having a pair of handles and a pair of longitudinally aligned dividers centrally disposed in the tray, wherein the dividers are disposed on opposite sides of a central orifice of the first tray from a right side to a left side of the first tray, wherein each divider forms a pair of compartments;
a second tray having a pair of handles and a pair of spaced apart internal walls continuously disposed in a parallel position to each other across the second tray from a right end to a left end thereof, wherein the internal walls define a triad of tray sections, each of the tray sections having an open bottom side;

a middle section of the tray sections comprising a brace surrounding a central orifice of the second tray, the brace dividing the bottom side of the middle section into half portions;

a third tray being the uppermost tray of the trays, the third tray having a lid, a fastening configured to secure the lid to the third tray, and a central orifice, wherein the lid has a center opening disposed therein, wherein the fastening is a pair of clasps;

wherein the first tray has a length and a width greater than a length and a width of the second tray;

wherein the length and the width of the second tray are greater than a length and a width of the third tray;

wherein the central orifice of each of the first and third trays is disposed in a closed bottom wall thereof, wherein the second rod engages the central orifice of each tray in a mounted condition, wherein the first tray is configured to slidingly engage the second rod in vertical position lower thereon than a vertical position of the second tray when the second rod is in an upright position; and wherein the third tray is configured to slidingly engage the second rod in a vertical position above a vertical position of the second tray and proximal a lowermost groove of the grooves when the second rod is in an upright position;

wherein the lid center opening has a diameter smaller than a diameter of the second rod at a point along the second rod proximal a lowermost groove of the grooves; and wherein in the mounted condition, each tray is removably disposed on the second rod in a position parallel to the pedestal and the trays are in a stacked configuration with the third tray disposed proximal the lowermost groove.

7. The farrier hoof cradle and tool caddy kit of claim 6 further comprising a rubberized sleeve removably engaging the hoof cradle.

8. The farrier hoof cradle and tool caddy of claim 7 further comprising a plurality of hook and loop fasteners disposed on the sleeve, wherein the hook and loop fasteners secure the sleeve to the hoof cradle.

9. The farrier hoof cradle and tool caddy kit of claim 6 wherein the wheel assemblies are spaced apart.

10. The farrier hoof cradle and tool caddy kit of claim 9 wherein each of the wheel assemblies comprises:

a pair of inverted U-shaped arms parallel to each other, each arm having a proximal end disposed on the upper side of the pedestal and a distal end extending beyond and disposed proximal an external perimeter of the pedestal; and a wheel pivotably disposed between the distal ends of the arms.

11. The farrier hoof cradle and tool caddy kit of claim 6 wherein each protrusion is a popoid.

* * * * *